(12) United States Patent
Chen

(10) Patent No.: US 8,463,894 B2
(45) Date of Patent: Jun. 11, 2013

(54) PERFORMANCE MONITORING WEB CONSOLE FOR DISTRIBUTED TRANSACTION SERVICE

(75) Inventor: Wei Chen, Beijing (CN)

(73) Assignee: Oracle International Corporation, Redwood Shores, CA (US)

(*) Notice: Subject to any disclaimer, the term of this patent is extended or adjusted under 35 U.S.C. 154(b) by 403 days.

(21) Appl. No.: 11/865,179

(22) Filed: Oct. 1, 2007

(65) Prior Publication Data

US 2008/0307088 A1    Dec. 11, 2008

Related U.S. Application Data

(60) Provisional application No. 60/942,907, filed on Jun. 8, 2007.

(51) Int. Cl.
*G06F 15/177* (2006.01)

(52) U.S. Cl.
USPC ............ 709/224; 709/223; 709/203; 709/208

(58) Field of Classification Search
USPC .................................. 709/220–226, 203, 208
See application file for complete search history.

(56) References Cited

U.S. PATENT DOCUMENTS

| | | | |
|---|---|---|---|
| 6,026,440 A | | 2/2000 | Shrader et al. |
| 6,714,976 B1 | | 3/2004 | Wilson et al. |
| 7,065,566 B2 * | | 6/2006 | Menard et al. ................. 709/223 |
| 7,124,134 B2 * | | 10/2006 | Buzzeo et al. .................. 707/10 |
| 7,269,625 B1 | | 9/2007 | Willhide et al. |
| 7,328,259 B2 | | 2/2008 | Srinivasan et al. |
| 7,382,371 B1 | | 6/2008 | Ciabarra |
| 7,383,396 B2 * | | 6/2008 | Wyman .......................... 711/141 |
| 7,574,567 B2 * | | 8/2009 | Wyman .......................... 711/141 |
| 7,627,631 B2 | | 12/2009 | Blevins |
| 2001/0032259 A1 * | | 10/2001 | Herrmann et al. ............ 709/224 |
| 2002/0173997 A1 | | 11/2002 | Menard et al. |
| 2003/0056199 A1 * | | 3/2003 | Li et al. .......................... 717/127 |
| 2003/0110312 A1 | | 6/2003 | Gunduc et al. |
| 2003/0144894 A1 | | 7/2003 | Robertson et al. |
| 2004/0064552 A1 | | 4/2004 | Chong et al. |
| 2004/0068560 A1 | | 4/2004 | Oulu et al. |
| 2004/0068728 A1 | | 4/2004 | Blevins |
| 2004/0088386 A1 | | 5/2004 | Aggarwal |
| 2004/0088403 A1 | | 5/2004 | Aggarwal |
| 2004/0215762 A1 | | 10/2004 | Oulu et al. |
| 2006/0129940 A1 * | | 6/2006 | Rajarajan et al. .............. 715/738 |
| 2006/0259704 A1 * | | 11/2006 | Wyman .......................... 711/141 |
| 2006/0280207 A1 * | | 12/2006 | Guarini et al. ................. 370/524 |
| 2007/0019561 A1 * | | 1/2007 | Peterson ........................ 370/252 |
| 2007/0174437 A1 * | | 7/2007 | Kraus ............................ 709/223 |
| 2007/0294399 A1 * | | 12/2007 | Grossner et al. .............. 709/224 |
| 2008/0155357 A1 * | | 6/2008 | Yu et al. ......................... 714/47 |
| 2008/0201465 A1 * | | 8/2008 | Jones et al. .................... 709/224 |
| 2008/0229308 A1 * | | 9/2008 | Wyman .......................... 718/100 |

\* cited by examiner

*Primary Examiner* — Kenneth R Coulter
(74) *Attorney, Agent, or Firm* — Fliesler Meyer LLP

(57) ABSTRACT

A computer-implemented system to support performance monitoring of distributed transaction service can comprise one or more distributive transaction monitoring infrastructures, wherein each distributive transaction monitoring infrastructure contains at least one local monitor server that receiving monitoring data from one or more distributive transaction monitoring processes; a central monitor server that accepts monitoring data from one or more distributive transaction monitoring infrastructures and stores monitoring data into a database; and a web application that communicates with the central monitor server and provides interaction with a user.

25 Claims, 6 Drawing Sheets

PERFORMANCE MONITORING WEB CONSOLE FOR DISTRIBUTED TRANSACTION SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of performance monitoring for distributed transaction service.

CLAIM OF PRIORITY

This application claims priority from the following application, which is hereby incorporated by reference in its entirety:

U.S. Provisional Application No. 60/942,907, entitled PERFORMANCE MONITORING WEB CONSOLE FOR DISTRIBUTED TRANSACTION SERVICE, by Wei Chen, filed on Jun. 8, 2007.

CROSS-REFERENCED CASES

The following application is cross-referenced and incorporated herein by reference:

U.S. patent application Ser. No. 11/865,188 entitled PERFORMANCE MONITORING INFRASTRUCTURE FOR DISTRIBUTED TRANSACTION SERVICE, by Wei Chen, filed on Oct. 1, 2007.

BACKGROUND

Tuxedo (Transactions for Unix, Extended for Distributed Operations) is a middleware platform widely used to manage distributed transaction processing in distributed computing environments. It is a proven platform for unlocking enterprise legacy applications and extending them to a services oriented architecture, while delivering unlimited scalability and standards-based interoperability.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses Tuxedo performance monitoring infrastructure as an example for distributed transaction services performance monitoring infrastructure. It will be apparent to those skilled in the art that other types of distributed transaction services performance monitoring infrastructure can be used without limitation.

Appendix B provides the definition of terms, acronyms, and abbreviations that are used in the description of the invention.

Figure 1:
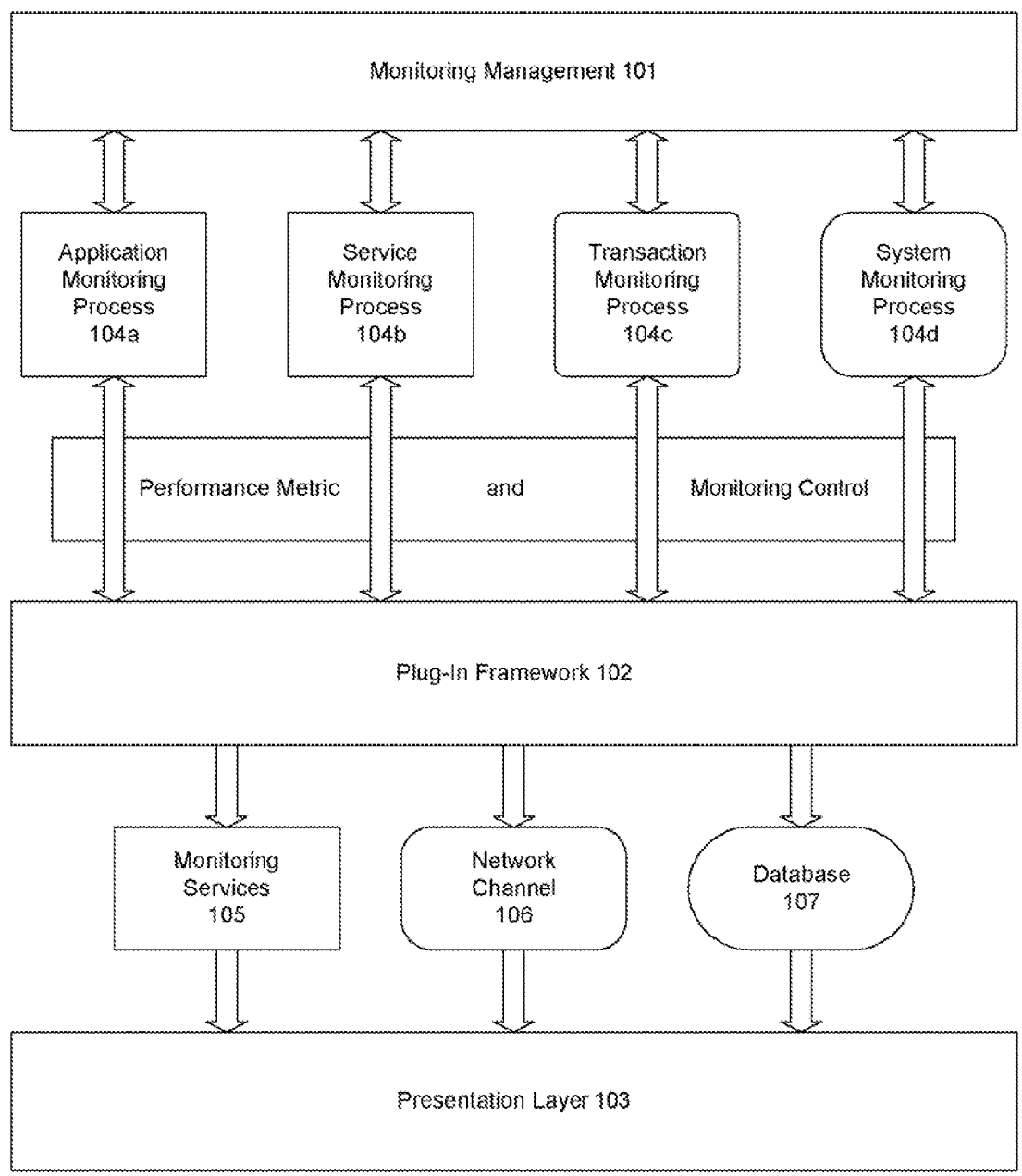
FIG. 1 is an illustration of an exemplary framework of layered Tuxedo monitoring architecture in accordance with one embodiment of the present invention.

As shown in FIG. 1, the whole Tuxedo monitoring architecture can be a layered system which includes monitoring definition, control, data collection and presentation.

One embodiment of the present invention is a computer-implemented system to support performance monitoring of distributed transaction service that can comprise a monitoring management tier 101 that provides services to a monitoring logic and policy control module; one or more monitoring processes 104a, 104b, 104c, or 104d that are controlled by the monitoring logic and policy control module; and a plug-in framework 102 that includes one or more plug-ins that is capable of receiving monitoring data from the one or more monitoring processes 104a, 104b, 104c, or 104d.

In one embodiment of the present invention, the monitoring management tier 101 performs at least one of the following functionalities: monitoring specification parsing; environment variable recognition; specification for a particular node, group and server; and Bulletin Board and process level cooperation.

For example, in Tuxedo performance monitoring infrastructure, such functionalities can be shown in the following list.

For monitoring specification parsing, the monitoring management tier in Tuxedo performance monitoring infrastructure can parse the specification string delivered by user through MIB and environment variable.

For environment variable recognition, TMMONITOR, a Tuxedo performance monitoring infrastructure, need to be parsed and enforced for any Tuxedo process supporting performance monitoring.

For MIB interface, a new MIB attribute can be defined and handled at levels of service, server and client MIB process.

For Bulletin Board and process level cooperation, the monitoring management tier in a Tuxedo performance monitoring infrastructure can reset handle.

In addition, a command, such as tmadmin in Tuxedo, can enable administrator to change TMMONITOR specification for a particular node, group and server. The command can use the MIB interface.

In one embodiment of the present invention, the monitoring logic and policy control module is capable of performing the following functionalities: selecting monitoring points based on monitoring category; defining logic at monitoring points; and handling performance metrics collection.

For example, in Tuxedo performance monitoring infrastructure, the functionalities of the monitoring logic and policy control module can include:

Where to add the monitoring instrument points based on monitoring category.

Logic at monitoring points, including how to prepare the metrics, how to enforce the policy control and how to deal with plug-in invocation.

Performance metrics collection, mainly for the system server monitoring.

Monitoring Categories

In one embodiment of the present invention, the monitoring process is one of an application monitoring process 104a; a service monitoring process 104b; a transaction monitoring process 104c; or a system monitoring process 104d.

The monitoring category can define "what" to be monitored. For example, in Tuxedo infrastructure, the above monitoring processes can be defined as followings.

Application Monitoring—This kind of monitoring focuses on user's particular application request. It addresses the end-to-end response time watching, service agreement enforcement based on dynamic message specific characteristics.

Service Monitoring—Service is the core concept in Tuxedo. Usually user want to get the first sight of their service running state when they are checking whether the system healthy or not.

System server monitoring—For a distributed computing environment, gateway and bridge of Tuxedo built-in processes act as a critical role. The other process type is handlers, such as the workstation handler, jolt handler and IIOP server etc. By monitoring the system server, user can know how much message pending on some network link, so that the network efficiency can be judged.

XA transaction performance—One of the most important functionalities of Tuxedo is as a XA compliant transaction monitor, especially in a distributed manner. So the XA calls efficiency checking can bring the benefit to distinguish which is the costive operation in the whole XA transaction. XA monitoring on the global coordination components, such as domain gateway and WTC, can log the mapping between two transactions.

Application Request Monitoring

Figure 2:
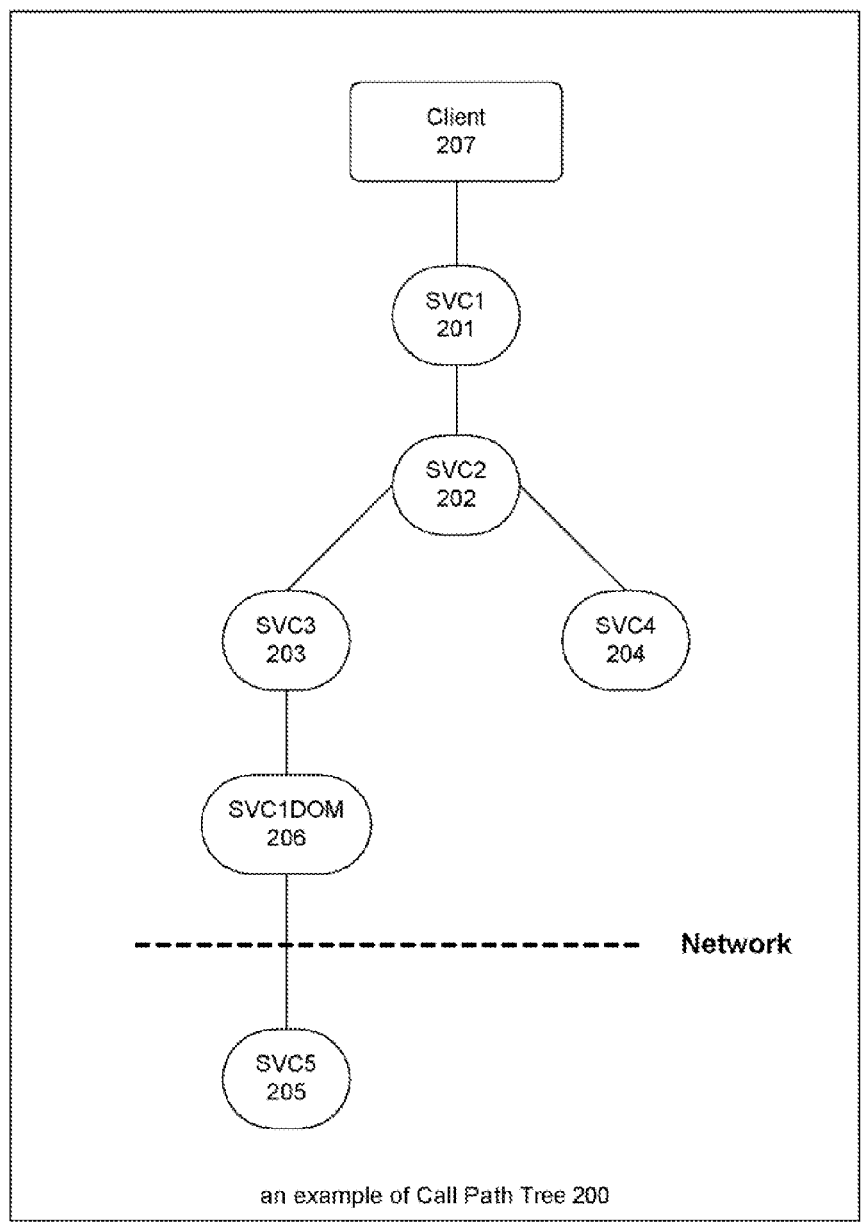
FIG. 2 is an exemplary illustration of a call path tree for in accordance with one embodiment of the invention.

In Tuxedo, an Application Request Monitoring can be at per-call level and the monitoring characteristic can be recognized by all the involved processes on the call path tree, as shown in FIG. 2, until the reply is received by the request initiator. The monitoring points on the call path tree must be adequate for performance watching and analysis. The monitored request can be started by a client process, a handler or an application server so that a particular group of requests can be monitored. The performance metrics of monitored application request can satisfy the followings.

The monitored request can be uniquely identified in Tuxedo systems, within one domain or across domains. The call path tree (will be described in more detail in the following sections) can include all the subsequent calls triggered by the first call until the reply message is got by the first client.

The call path tree can cover the major service call steps among Tuxedo processes, IPC queue and network.

When a process gets a message indicating it is monitored, the process can get:
1) the timestamp when the first request comes out from the requestor;
2) the timestamp when this message comes into its queue or process;
3) the IP address of the initial client (only apply to remote client, such as workstation client, jolt client and IIOP client);
4) the depth of the call path tree of this request/reply message; and
5) its unique identifier, that is the correlation ID.

The metrics fields at each monitoring points can include:
1) buffer size;
2) message type such as: request message or reply message; and ATMI message or CORBA message;
3) for CORBA message, its operation name as it is packaged; and
4) current stage of monitoring point The unique identifier of the monitored request can be transparent with Tuxedo which means it is the responsibility of the plug-in to generate the unique identifier and Tuxedo propagates the unique identifier with the message.

The user message buffer can be passed to plug-in for further monitoring purpose.

In addition, the request type can support ATMI request/response, /Q and CORBA. An ATMI primitive can be provided to let programmer retrieve the application monitoring metadata with a Tuxedo typed buffer.

Service Execution Monitoring

In Tuxedo, the existing facility that can support the service level statistics for a particular application server has the following limitations:
1) the data logging may not be extended;
2) the metrics are limited and only execution time accounted;
3) Service advertised by gateway may not be supported; and
4) the monitoring behavior can be fixed and hard to be adjusted dynamically.

One embodiment of the present invention can enhance the service level statistics in following areas:
1) More indices can be supported as following, besides service execution time:
  a) buffer size;
  b) server request queue depth;
  c) waiting time in queue (approximately); and
  d) service execution status, such as the Tuxedo error code;
2) The service can be maintained by the gateway, GWT-DOMAIN and GWWS can be included;
3) The plug-in framework can obtain the data;
4) The monitoring behavior can be adjusted dynamically; and
5) The user message buffer can be passed to plug-in for further analysis.

System Process Monitoring

A distributed transaction system, such as a Tuxedo system, can have several built-in processes playing different roles. Sometimes the performance of these system processes can be critical to user's application. In Tuxedo, the system process monitoring can require following functionalities for individual process types.

GWTDOMAIN—For the domain gateway process, the monitoring can be able to know 1) at the monitoring time point, how many messages are queued on a particular network link 2) at the monitoring time point, the total data volume are queued on a particular network link 3) the accumulated message number during the past monitoring interval 4) the accumulated data volume during the past monitoring interval. 5) how many replies being waited on particular network link 6) remote domain connection status.

BRIDGE—The metrics collected for BRIDGE can be the same as GWTDOMAIN except of the number of replies being waited. The reason can be that BRIDGE may not decode the message buffer for performance consideration.

GWWS—The soap gateway can provide inbound and outbound supports. Following metrics can be provided 1) concurrent network client number 2) tuxedo client number (outbound) 3) the accumulated network client number during the past monitoring interval 4) the accumulated tuxedo client number during the past monitoring interval.

WSH—The workstation handler can work as a delegation process for the workstation client. Following metrics can be provided 1) concurrent client number 2) the accumulated network client number during the past monitoring interval.

JSH. The jolt server can work as a delegation process for jolt client. It can have same performance metrics as workstation handler.

ISH. The IIOP server. It can have the same performance metrics as WSH and JSH but the client can be with CORBA personality.

XA Transaction Monitoring

The XA interface can involve the interaction between Tuxedo and the resource manager. Here, Tuxedo can act as a TP monitor. In Tuxedo, the following performance metrics can be provided.

XA calls performance measurement, it can include xa_open, xa_close, xa_start, xa_end, xa_prepare, xa_complete, xa_recorvy and xa_commit and xa_rollback. The measurement can be correlated with the transaction ID (xa_open and xa_close does not support transaction ID). The execution time of each XA calls and the return code can be included in each XA call monitoring.

GWTDOMAIN can have additional monitoring points for local GTRID and remote GTRID correlation In the above example, given a GTRID, the above performance factors can be provided and give user reference for their resource manager tuning.

Monitoring Control

Monitoring Policy

In one embodiment of the present invention, the following monitoring policies can be supported.

Monitoring frequency based on number of requests—One example is that the monitoring action can happen at each ninth requests. Making it configurable can reduce the performance impact.

Monitoring interval based on time—It means the monitoring action happens in a time interval manner. For example, start one monitoring action each minute Be able to disable the recognition of being monitored message—The purpose is to let a process to avoid the annoyance of incoming message which indicates it is being monitored. Furthermore, a monitored application can be controlled at the initiator side for no invocation of plug-in.

In one example, the first two policies are exclusive and can be selected according to application type and integration requirements. In another example, application request monitoring and service execution statistics can be required to support both the two polices. System monitoring can be required for time based interval policy. XA transaction can support the message number based policy.

In addition, the policy can support individual monitoring category independently.

Data Fields Filtering

Sometimes, since customer has different interested area, the full performance metrics can be too many for user. In one example, for the application request monitoring and service execution monitoring, customer can be able to configure the interested data indices. The Tuxedo infrastructure can try to reduce collecting effort according to the required fields.

Monitoring Points and Data fields

To match the monitoring categories defined in above sections, Tuxedo infrastructure can include the monitoring points for different categories that may not be overlap since the policy may vary. From the monitoring points, Tuxedo infrastructure can pass the performance metrics to the plug-in. These metrics can be defined in FML32 field. Here, the reason is for convenient usage and extensibility because FML is the container type buffer. In addition, in the required fields' specification of TMMONITOR specification, the FML32 field name can also be used to let the system know which fields are preferred. Appendix A shows the monitoring points selection for all monitoring categories.

Application Call Path Tree

In the case of an application monitoring process, the monitoring process contains a monitoring initiator that initiates a call path tree. In addition, the monitoring data can be performance metrics that are consistent with application correlation.

In one example, the message travel path of a monitored request can be a tree. The followings can be the key characteristics of the call path tree definitions.

The tree's shape can be determined by request message—The request message can decide which remote service needs to be called in a server or client. The root node of the tree can be the monitoring initiator. It can have only one child node which is the first service it calls.

Tree Node—A tree node can be a service execution procedure except the root node.

Tree Edge—The edge can connect the service consumer and the service provider. Underneath the tree edge can be the physical transportation of the message. Since the call path tree can be service centric, the transportation might be different between separate monitored requests but the edge is same. One scenario is when multiple same types of services are deployed in MP mode for load balance purpose. The sequence of one node's bottom edges can be the same as the invocation order.

Domain Gateway Treatment—Domain gateway can be a proxy server for remote service. The two domains can be treated as one unit to provide service for local users. For example, domain gateway maps remote service DOM2SVC to local service as SVC1, SVC1 can be considered as a node on the call path tree, its child node is DOM2SVC. The transportation of their edge is network plus ipc queue.

Forward Model—Since the call path tree can be determined by request message, the tpforward can also issue a request. So the call path tree can be the same in the case of a normal RPC procedure. But the transportation of an edge can reflect the difference. For non-forward scenario, the reply transportation is the reverse of the request transportation, but for forward case, the reply transportation is not.

Leaf Node. The leaf node on the call path tree can be the service that may not call other service or in treatment. So one can use this attribute to decide the active service processes involved in the monitored request. For an active request, there may be multiple leaves nodes at the same time since the call might be made asynchronously.

One example of the call path tree can be shown in FIG. 2. In this example, one can assume a client 207 call SVC1 201, SVC1 201 calls SVC2 202, SVC2 202 calls SVC3 203 and SVC4 204. SVC3 203 will call SVC1DOM 206 and the later is a remote service which remote name is SVC5 205.

In this example, SVC1DOM 206 is a service provided by local GWTDOMAIN and there is one edge between SVC1DOM 206 and remote service SVC5 205. If SVC2 202 invoke SVC3 203 and SVC4 204 asynchronously and the service treatment hung at both the SVC5 205 and SVC4 204, the active monitoring must provide both detail information about SVC4 204 and SVC5 205.

Monitored Request State Changing Diagram

Figure 3:
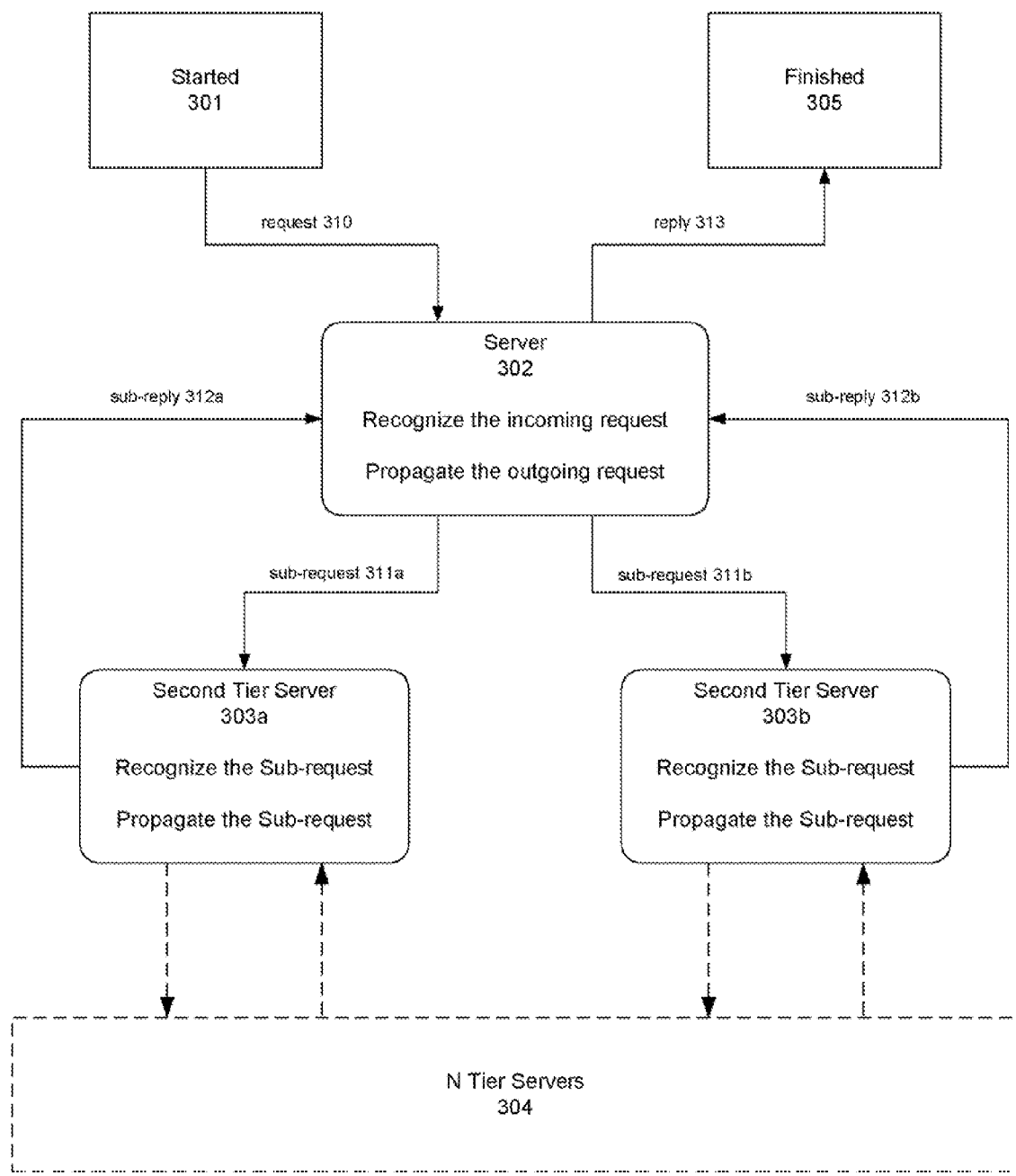
FIG. 3 is an exemplary illustration of monitored request State changing diagram in accordance with one embodiment of the invention.

As shown in FIG. 3, the monitoring action can be initiated by a client process, handler process and application server process. The reason can be that this kind of processes has clear logic in an "application" manner. In Tuxedo, the sub-request 311a and 311b can inherit the META TCM information from its parent request 310, such as correlation ID, startup time stamp and client IP. The process hops can indicate the call path tree depth for the sub-request.

In one example, following rules can be applied in the performance metrics collection, plug-in invocation and message propagation.

When application server or handlers return reply message to client, the META TCM must be dropped if the corresponding request message is not a monitored request.

The field modification from plug-in are only allowed for request message because one parent request 310 may trigger multiple sub-request 311a and 311b and sub-reply 312a and 312b and it can be confusion if required fields are changed by plug-in at reply monitoring points. Furthermore the reply 313 only inherits the required fields from its direct request 310.

Pluggable Data Logging

The data logging in Tuxedo can be file-based, such as ULOG or stderr. The data logging in Tuxedo performance monitoring framework can also require the data logging be in a pluggable way, which can let user develop their own implementation and do anything they want. In one example, the following capabilities can be supported.

Each monitoring category may not need to support all three policies as described in previous sections. Some of them can support two, some of them can support one or some of them do not support anyone of them. The Tuxedo infrastructure can let the plug-in know what kind of data passed. And the plug-in can modify the data set accordingly. For application request monitoring, the modified required fields can be propagated to involved process and take effect.

The plug-in can modify the monitoring policy in the proper places

The plug-in can generate the correlation ID in the proper place and Tuxedo infrastructure can propagate it with this message.

In addition, the Tuxedo performance monitoring service can support a default a plug-in. The plug-in framework can support multiple plug-in at the same time. The plug-in may need to guarantee the data consistent between its operation and the infrastructure.

Plug-In Framework and Fan-Out Plug-In Model.

In one embodiment of the present invention, the plug-in framework uses a fan-out plug-in model.

As an example of a Plug-in Interface, the plug-in framework in Tuxedo can include following components, Header files and data structure definition Plug-in implementations Plug-in manipulation with Tuxedo registry Tuxedo plug-in framework supports the plug-in interceptors which can support multiple plug-in implementations that can be invoked for one interface. Two kinds of interceptors can be supported: fan-out and stack. In one example, the monitoring interface supports the fan-out mode. The invocation relationship can be shown in FIG. 4.

Figure 4:
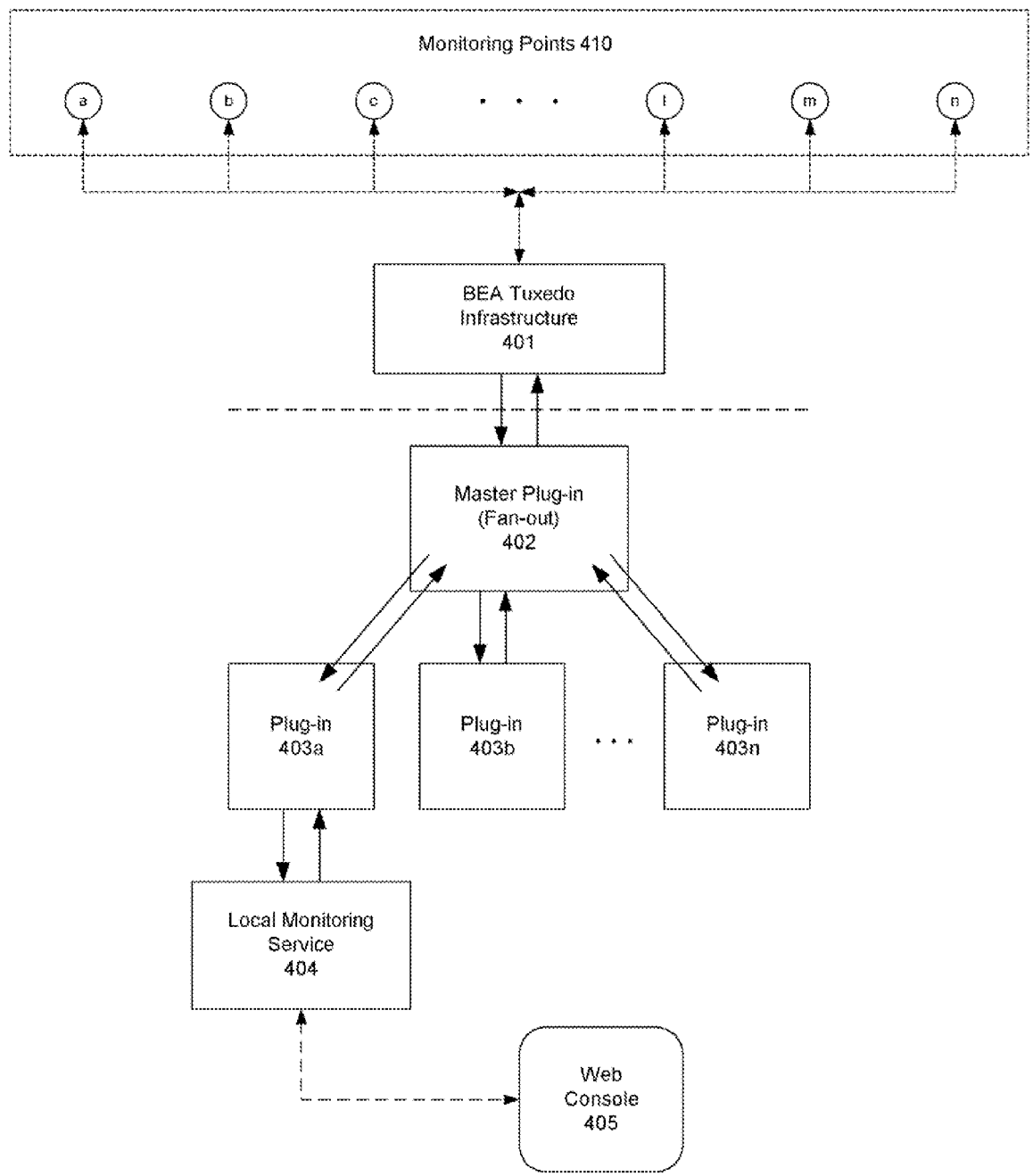
FIG. 4 is an exemplary illustration of a plug-in framework that uses a fan-out model in accordance with one embodiment of the invention.

In the example as shown in FIG. 4, the key characteristics of the fan-out plug-in model can be, When the client invokes method X of a master plug-in 402, method X of the master plug-in 402 invokes method X of the intercepting plug-ins 403a-n in the order specified by the InterceptionSeq attribute of the master plug-in 402, as follows,
1. method X of plug-in 403a is invoked
2. method X of plug-in 403a returns
3. method X of plug-in 403b is invoked
4. method X of plug-in 403b returns
5. eventually, method X of plug-in 403n is invoked
6. method X of plug-in 403n returns
7. method X of the master plug-in 402 returns to the caller All plug-ins involved in the interceptor implement the same interface.

Multiple occurrences of the same plug-in are not allowed in an interception sequence.

In one performance monitoring scenario, Tuxedo can provide the master plug-in (fan-out) and a default plug-in. Customers can replace the default plug-in with their own implementation or attach their own implementation after the default plug-in.

In one performance monitoring scenario, an API to provide application request monitoring metrics. In another performance monitoring scenario, a presentation layer can be connected with the plug-in Framework through at least one of: a monitoring services component; a network channel; or a database.

One embodiment of the present invention is a computer-implemented method to support performance monitoring of distributed transaction service, comprising selecting monitoring points based on monitoring category; defining monitoring logic at monitoring points; handling monitoring data collection; and passing monitoring data to a plug-in.

In one embodiment of the present invention, the computer-implemented method further comprises performing monitoring management services which includes at least one of: monitoring specification parsing; environment variable recognition; specification for a particular node, group and server; and Bulletin Board and process level cooperation;

Performance Monitoring Web Console System Architecture

A typical web application can contain following components,

View, which designates the presentation logic for end users. It is the front end responsible for interaction with user directly.

Backend modules, which is the major computing elements in the web application. Usually it includes database operation, business logic process etc. For example, Tuxedo infrastructure is also part of the backend.

Between "View" and "Backend", there can be a "Control" layer. It can correlate the user presentation and the backend components together.

Figure 5:
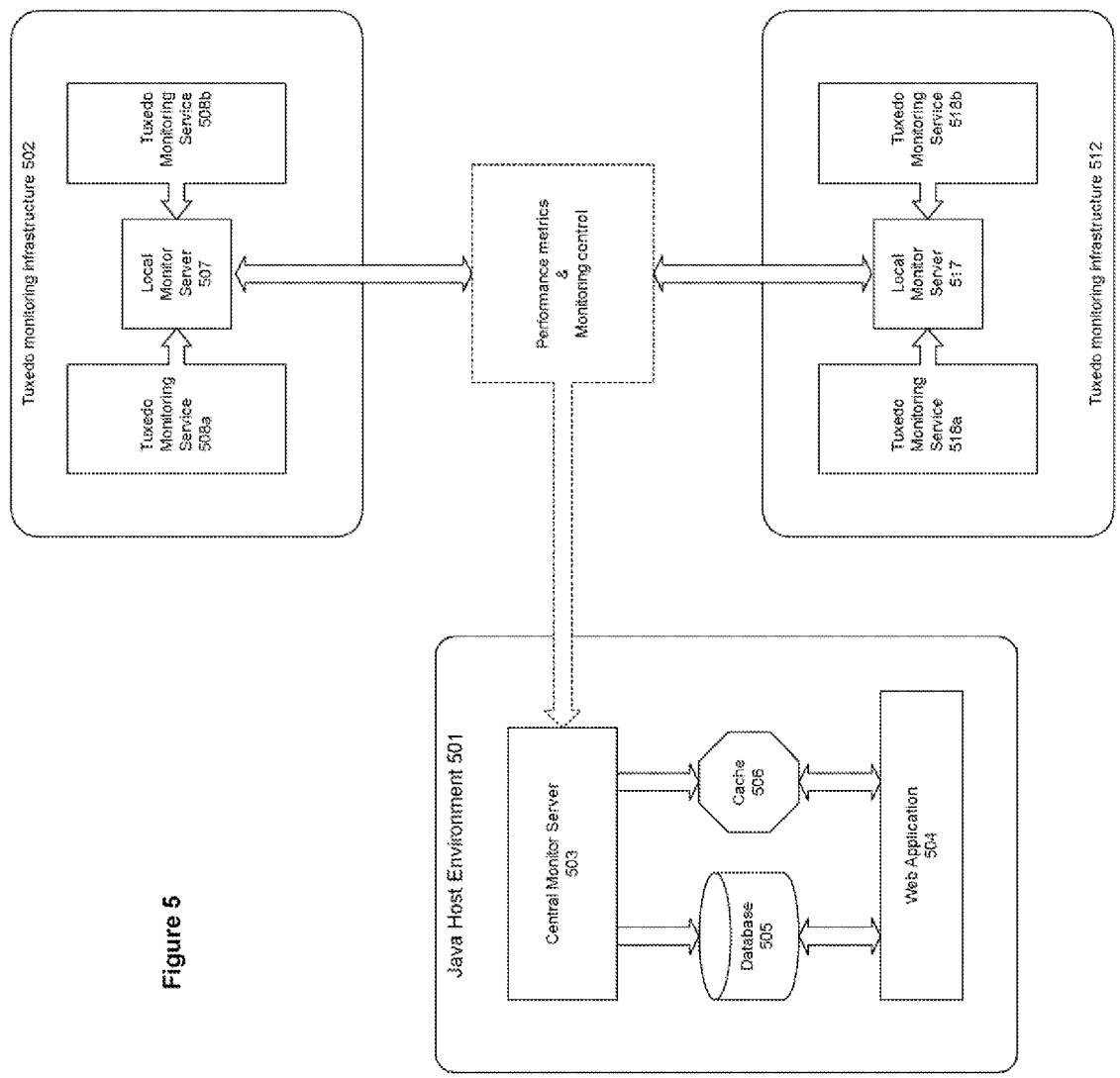
FIG. 5 is an illustration of an exemplary framework of Tuxedo monitoring architecture with web console in accordance with one embodiment of the present invention.

FIG. 5 explains the web console architecture for Tuxedo performance monitoring.

In one embodiment of the present invention, the major components can be,

Tuxedo monitoring infrastructure for performance monitoring—The focus is a local monitor server which can handle the communication between instrumented Tuxedo process and itself, then between itself and the central data collection server.

A central monitor server—It can accept performance metrics that can be collected from Tuxedo and stored into database. It can also be responsible for some management requirements between the user interface and Tuxedo, such as monitoring schema design.

Database—The database involves the table, view and index design. It can act as the persistent data layer between web application and the central data collection server.

Web Application—It can contain web pages layout and functionality, backend data source organization, communication with the central data collection server and logic module.

User Interface and Functionalities

A user interface can have the following characteristics:

a consistent style of look and feel.

a uniform style that can be applied to all the pages which use similar elements, such as table, header, button, selection etc.

a user interface that can support the mainstream browser—IE 6.0+ and Firefox 1.5+.

web pages that may not use platform dependent technology, such as VBscript and ActiveX Java Applet usage that can be limited, but not prohibited.

From user's point of view, following functions can be provided.

Administration—It can involve the central data collection server configuration, JDBC configuration, security management and monitoring specification definition.

Live Monitoring—The live monitoring can give the capability for user to get the "now" information for some particular messages and system information.

Alerts Management—User can define the alerts and correlated with action.

Statistic functionality—The statistics computing can be based on data in database. The scope can include service level, server level and application request pattern level.

Help

One embodiment of the present invention is a computer-implemented system to support performance monitoring of distributed transaction service that comprises one or more distributive transaction monitoring infrastructures 502 and 512, wherein each distributive transaction monitoring infrastructure 502 or 512 can contain at least one local monitor server 507 or 517 that receiving monitoring data from one or more distributive transaction monitoring processes 508a and 508b, or 518a and 518b; a central monitor server 503 that can accept monitoring data from one or more distributive transaction monitoring infrastructures 502 and 512 and store monitoring data into a database 505; and a web application 504 that can communicate with the central monitor server 503 and provides interaction with a user.

In one embodiment of the present invention, the central monitor server 503 can further send monitoring control information to the distributive transaction monitoring infrastructures.

In one embodiment of the present invention, the monitoring process can be one of an application monitoring process; a service monitoring process; a transaction monitoring process; or a system monitoring process.

In one embodiment of the present invention, the application monitoring process can contain a monitoring initiator that initiates a call path tree.

In one embodiment of the present invention, the distributive transaction monitoring processes can pass monitoring data to one or more plug-ins in a plug-in framework that uses a fan-out plug-in model.

In one embodiment of the present invention, there can further be a cache 506 that can connect to the central monitoring server and the web application, wherein the cache can keep all latest events generated by event sources including user-defined alert checking and system events.

In one embodiment of the present invention, the web application 504 can provide an application pattern that summarizes a calling pattern of a particular request and gives statistic data on each step of each request.

In one embodiment of the present invention, the local monitor server 507 or 517 can be based on a distributive transaction service managed multi-thread server.

Local Monitor Server

Figure 6:
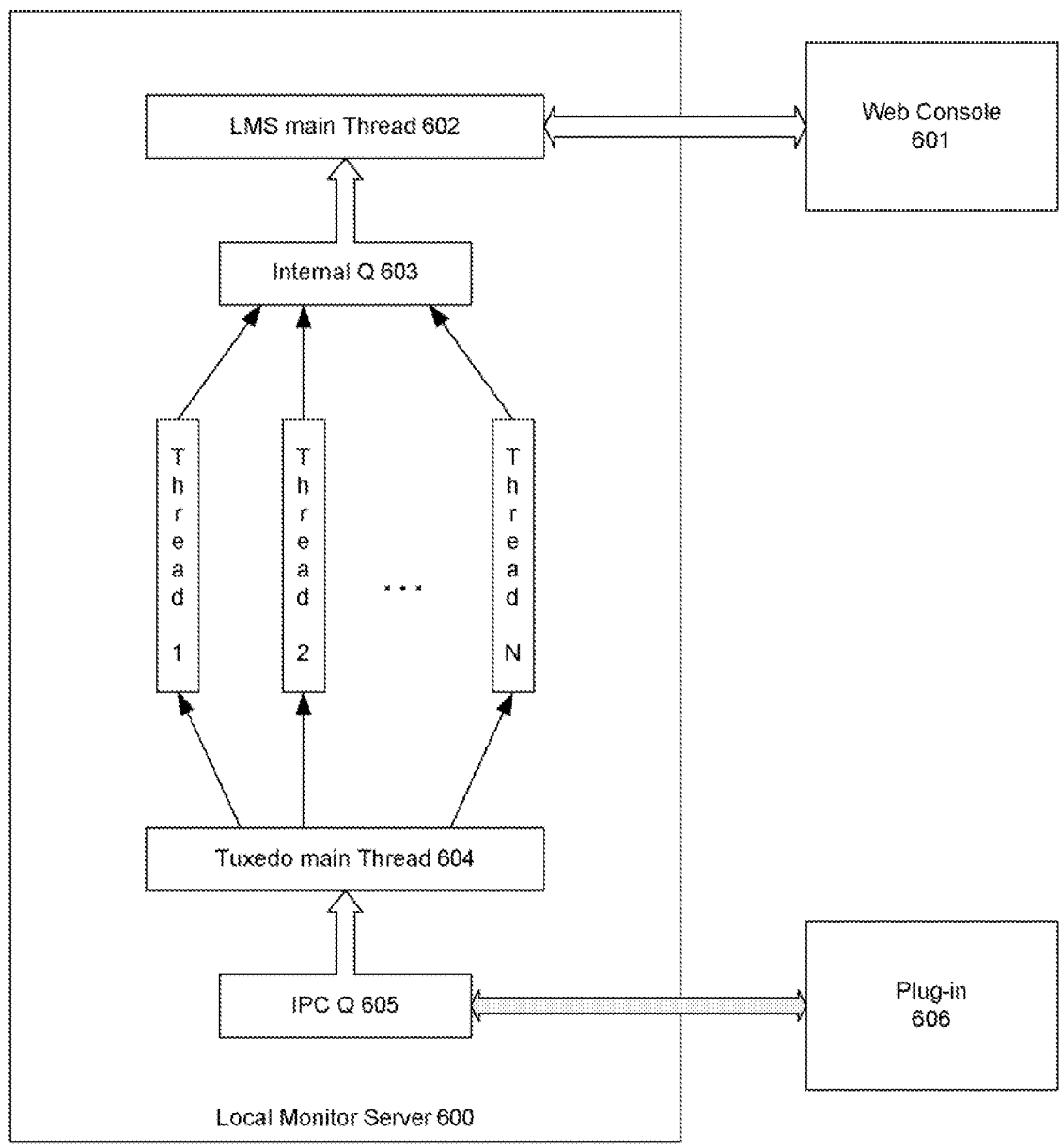
FIG. 6 is an exemplary illustration of a local monitor server in accordance with one embodiment of the invention.

The local monitor server can be a Tuxedo system server as shown in FIG. 6. It can have these functions, Acting as the local Tuxedo domain data collection proxy Composing message to java server side Handling the event message from the java server and post it to Tuxedo system.

There can be multiple instances in a Tuxedo domain. It can be a HTTP client and can convert the metrics to XML buffer and sends to java side. One example of its definition in UBBCONFIG can look like the following. A suggested name can be "LMS", which represents "Local Monitor Server".

List 1. A sample definition of a Local Monitor Server LMS SRVGRP=SYSGRP SRVID=10 CLOPT="-A—-t 60-x 1000000-1 server.abc.com:2345/tsam/dataserver"

Here,

−1 is the service end point URL of console data collection server. For performance consideration, LMS can support keep-alive feature defined in HTTP protocol −t is the heart beat interval in seconds from LMS to the console server. It's default value is 30 seconds. Even no performance monitoring, LMS can send a heartbeat message to console with the heartbeat interval.

−x is the memory cache size. Since the console might be done, the LMS have a memory queue for storing the performance metrics. The default size of the queue is 1000000. Once this limit is exceeded, LMS will drop the performance data from plug-in.

The LMS can advertise a service called "LMSSVC" and the plug-in sends performance metrics to this service. LMS can be a multithreaded server so it is recommended that user may need to set the dispatch thread number in UBBCONFIG to a proper value.

For a high volume Tuxedo environment, each node a LMS deployed can relieve the inter-domain communication impact.

If LMS fails to connect with the central monitor server, it can log an error message in ULOG and retry at heartbeat interval.

In one embodiment of the present invention, the local monitor server has a main thread that lives through the whole life cycle of the local monitor server.

One embodiment of the present invention is a computer-implemented method to support performance monitoring of distributed transaction service that comprises receiving monitoring data from one or more distributive transaction monitoring processes by one or more local monitoring servers; accepting monitoring data from one or more local monitoring servers by a central monitor server and storing monitoring data into a database; and communicating with the central monitor server using a web application and providing interaction with a user.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

APPENDIX A

Monitoring Points Selection
Application Request Monitoring
Native Client
Application Request Monitoring Initiate
    1. tmcall.c:tpcall_internal( )
    2. tmacall.c:tpacall_internal( )
Receives Monitored Reply through IPC queue
    1. tmgetrply.c:tmgetrply( )
Workstation Client
Application Request Monitoring Initiate
    1. wsacall.c:tpacall( )
    2. wscall.c:tpacall_internal( )
Receives Monitored Reply through Network
    1. wsmsg.c:_wsc_getrply( )
Application Server
Acts as Application Request Monitoring Initiator
    1. tmcall.c:tpcall_internal( )
    2. tmacall.c:tpacall_internal( )
Acts as Monitored Message Pass-Through Process
    1. Receives Monitored Request
        a. tmsvcdsp.c:_tmsvcdsp( )
    2. Receives Monitored Reply
        a. tmgetrply.c:tmgetrply( )
    3. Sends Monitored Reply
        a. tmreturn.c:tpretum( )
        b. tmfoward.c:tpfoward( )
GWTDOMAIN
Receives Monitored Request from IPC queue
    1. gwmsgrcv.c:gw_msg_recv( )
Sends Monitored Request through Network
    1. gwnw_acall.c:gw_nw_snd( )
Receives Monitored Reply from Network
    1. gwnw_recv.c:_dom_msgrcv( )
Sends Monitored Reply through IPC queue
    1. gwmsgrply.c:gw_msg_reply( )
BRIDGE
For BRIDGE, the instrument point can be limited because in most stage BRIDGE does not decode the data. For example, the only points are when BRIDGE sends the request message to application server's request queue, and sends reply message to clients queue.
Sends Monitored Request through IPC queue
    1. brunw.c:br_msgrcv( );
Sends Monitored Reply through IPC queue
    1. brunw.c:br_msgrcv( );
In one example, to reduce the performance impact, no decoding of the message in BRIDEG.
GWWS
GWWS only can act as the application request monitoring initiator.
    tuxserver.c:gwws_thr_tux( )
WSH
WSH can act as the monitoring initiator and also can recognize the monitored request and reply. We are interested at two points in WSH, delivering a request to IPC queue and sending a reply to workstation client.
Acts as Application Request Monitoring Initiator
    1. Initiates a new monitoring
        a. wshprotocol.c:_wsh_acall( )
Acts as Monitored Message Pass-Through process
    1. Sends a Monitored Request through IPC queue
        a. wshprotocol.c:_wsh_acall( )
    2. Sends Monitored Reply through Network
        a. wshevent.c:_wsh_procmsg ISH
ISH is the IIOP server of Tuxedo CORBA. It only can act as the application initiator.
  Initiates a New Monitoring Request
    1. tmmethod.c:_tp_method_rcq( )
  Receives Monitored Reply
    1. tmmethod.c:_tp_method_rply( )
JSH
JSH is the Jolt handler which works in a similar model as WSH. It only can acts as the application initiator.
  Initiates a New Monitoring Request
    1. jwshunw.c:msgrcv_internal
  Receives Monitored Reply
    1. jwshevent.c:_wsh_procmsg
/Q Servers
TMQUEUE and TMQFORWARD will be modified to support the application request monitoring.
  En-queue action
    1. qmdml.c:_qm_enqueue_action
  De-queue action
    1. qmdml.c:_qm_dequeue_action
  Service Monitoring
  Application Server
  De-queue request Message
    1. tmsvcdsp.c:_tmsvcdsp( )
  En-queue reply Message
    1. tmreturn.c:tpretum( )
    2. tmfoward.c:tpfoward( )
  GWTDOMAIN
  De-queue Request Message
    1. gwmsgrcv.c:gw_msg_recv( )
  En-queue Reply Message
    1. gwmsgrply.c:gw_msg_reply( )
  GWWS
  De-queue Request Message
  En-queue Reply Message
  System Server Monitoring
  GWTDOMAIN
    The monitoring point is at GWTDOMAIN regular operation loop. We suggest put it at gwsvrrun.c:thrgw_proc_loop( ). For single thread mode, the monitoring point is at gw_run_svr.
  BRIDGE
    The monitoring point of BRIDGE happens at BRIDGE regular operation loop. The possible point is at brrun.c:_tmrunserver( ) or brrun.c:brthr_tmrunserver( ).
  WSH/ISH/JSH/GWWS
  WSH:wshrun.c
  JSH:jwshrun.c
  ISH:wshrun.c
  XA Transaction Monitoring
  XA Call. Each XA call is added the monitoring phrase.
    1. xasys.h
  GWTDOMAIN. GWTDOMAIN only handles the local GTRID creation time.
    1. gwttranmgmt.c:gw_nw_get_txid( )

APPENDIX B

Definitions of Terms, Acronyms, and Abbreviations
GWTDOMAIN—The domain gateway process connecting different Tuxedo domains with /TDOM protocol.
BRIDGE—Tuxedo system process that acts as network proxy in MP mode.
WSH—Tuxedo workstation handler process which delegates request/reply of workstation clients
JSH—Similar with WSH but delegates Jolt clients
ISH—IIOP server of Tuxedo CORBA
GWWS—Tuxedo web services gateway in SALT product.
ATMI & CORBA—Tuxedo has two personalities in middle ware terms. One is ATMI, the Application Transaction Monitoring Interface; and the other is CORBA.
FML—Field Manipulation Language which is a Tuxedo built-in buffer type. It is a container style buffer type with tagged-value style. Tuxedo provides a set of primitives for FML manipulation. It has two modes, FML16 and FML32. Tuxedo can use FML32 as the data buffer communicating with tracing plug-ins.
Tuxedo PIF—Tuxedo Plug-in Framework.
WTC—Weblogic Tuxedo Connector. The component locates at Weblogic server which provides two-way communication between Weblogic server and Tuxedo. It uses /TDOM protocol.
Monitoring Points—The instruments points in Tuxedo framework to collect data and invoke plug-in. This is the first hand data source for logging, analysis and representation.
Monitoring Category—The factors are interested for monitoring in Tuxedo. One category will have one set of monitoring points.
Monitoring Policy—The policy to control the monitoring behavior of particular monitoring category. It can impact how Tuxedo framework collects the performance metrics. The major consideration is for flexibility and reducing the overall performance impact.
Monitoring Plug-in—The plug-in is the data collection mechanism. For each monitoring point, Tuxedo framework can transfer the data metrics to the plug-in. It is the freedom of the plug-in with regarding how to process the data. The data might be logged to a file or sent to remote management node in a TCP channel. The plug-in interface is based on Tuxedo PIF. The plug-in can impact the monitoring policy. In the mean time, the plug-in can also depend on the monitory category and policy.
Monitoring Data Fields—The data fields means the real data set collected from Tuxedo infrastructure. Each metrics has its semantics and belong to one or several monitoring categories. The plug-in interface between Tuxedo infrastructure and the plug-in implementation indicates what kinds of fields are available and what kinds of plug-ins can modify the required fields for particular request.
Application Monitoring Initiator—The process which can indicate a request message to be monitored on its call path tree.
User Interface—It means how the data are parsed and represented to the end user in a friendly and convenient way. It can be some command line tool or web console interface. This part is independent from monitoring infrastructure of Tuxedo.
TMMONITOR—Tuxedo Performance Monitoring Facility.
MIB—Tuxedo Management Information Base. It is the Tuxedo administration service which defines Tuxedo elements into classes and attributes.
TCM—Typed Container Module. It is an extensible header framework of Tuxedo message propagation. Currently most major Tuxedo infrastructure related information pertinent to message is treated in TCM manner. User buffer is also a type of TCM.

What is claimed is:
1. A computer-implemented method to support performance monitoring of distributed transaction service, comprising:

receiving monitoring data from a plurality of distributive transaction monitoring processes by a plurality of local monitoring servers, wherein the monitoring data received by plurality of local monitor servers contains performance information on each individual operation in one or more transactions associated with the plurality of distributive transaction monitoring processes, wherein each of the plurality of local monitor servers uses a multithread model that includes a main thread that lives through a whole life cycle of the local monitor server and a plurality of monitoring threads, wherein each monitoring thread of the plurality of monitoring threads operates to receive monitoring data from one or more of the plurality of distributive transaction monitoring processes;

accepting monitoring data from the at least one local monitoring server by a central monitor server and storing the monitoring data into a database; and allowing communication with the central monitor server using a web application and providing interaction with a user.

2. The method according to claim 1, further comprising:
setting up monitoring points and monitoring policy;
collecting monitoring data at monitoring points; and
further sending monitoring control information to the plurality of local monitor servers by the central monitor server.

3. The method according to claim 1, further comprising:
allowing the plurality of distributive transaction monitoring processes to include one or more of:
an application monitoring process;
a service monitoring process;
a transaction monitoring process; and
a system monitoring process.

4. The method according to claim 1, further comprising:
allowing the plurality of distributive transaction monitoring processes to include an application monitoring process which contains a monitoring initiator that initiates a call path tree.

5. The method according to claim 1, further comprising:
receiving monitoring data from one or more plug-ins in a plug-in framework that uses a fan-out plug-in model.

6. The method according to claim 1, further comprising:
connecting a cache to the central monitoring server and the web application, wherein the cache keeps all latest events generated by event sources including user-defined alert checking and system events.

7. The method according to claim 1, further comprising:
providing an application pattern that summarizes a calling pattern of a particular request and gives statistic data on each step of each request.

8. A nontransitory machine readable storage medium having instructions stored thereon, that when executed, cause a system to perform steps comprising:
receive monitoring data from a plurality of distributive transaction monitoring processes by a plurality of local monitoring servers, wherein the monitoring data received by the plurality of local monitor servers contains performance information on each individual operation in one or more transactions associated with the plurality of distributive transaction monitoring processes, wherein each of the plurality of local monitor servers uses a multithread model that includes a main thread that lives through a whole life cycle of the local monitor server and a plurality of monitoring threads, wherein each monitoring thread of the plurality of monitoring threads operates to receive monitoring data from the one or more of the plurality of distributive transaction monitoring processes;

accept monitoring data from the plurality of local monitoring servers by a central monitor server and storing the monitoring data into a database; and allow communication with the central monitor server using a web application and provide interaction with a user.

9. The machine readable storage medium of claim 8, further comprising instructions, that when executed, cause the system to:
set up monitoring points and monitoring policy;
collect monitoring data at monitoring points; and
send monitoring control information to the plurality of distributive transaction monitoring processes from the central monitor server.

10. The machine readable storage medium of claim 8, wherein:
the plurality of distributive transaction monitoring processes include one or more of:
an application monitoring process;
a service monitoring process;
a transaction monitoring process; and
a system monitoring process.

11. The machine readable storage medium of claim 8, wherein:
the plurality of distributive transaction monitoring processes include an application monitoring process which contains a monitoring initiator that initiates a call path tree.

12. The machine readable storage medium of claim 8, further comprising instructions that when executed, cause the system to:
receive monitoring data from one or more plug-ins in a plug-in framework that uses a fan-out plug-in model.

13. The machine readable storage medium of claim 8, further comprising instructions that when executed, cause the system to:
include a cache that connects to the central monitoring server and the web application, wherein the cache keeps all latest events generated by event sources including user-defined alert checking and system events.

14. The machine readable storage medium of claim 8, wherein:
the web application provides an application pattern that summarizes a calling pattern of a particular request and gives statistic data on each step of each request.

15. A computer-implemented system to support performance monitoring of distributed transaction service, comprising:
a plurality of local monitor servers, each running on one or more processors, wherein each of said plurality of local monitor servers receives monitoring data from a plurality of distributive transaction monitoring processes;
wherein the monitoring data received by each of said plurality of local monitor servers contains performance information on each individual operation in one or more transactions associated with the plurality of distributive transaction monitoring processes;
wherein each of said plurality of local monitor servers uses a multithread model that includes a main thread that lives through a whole life cycle of the local monitor server and a plurality of monitoring threads, wherein each monitoring thread of the plurality of monitoring threads operates to receive monitoring data from one or more of the plurality of distributive transaction monitoring processes;

a central monitor server that accepts monitoring data from thet plurality of local monitor servers and stores the monitoring data into a database; and a web application that communicates with the central monitor server and provides interaction with a user.

16. The system according to claim 15, wherein:
the central monitor server further sends monitoring control information to the plurality of local monitor servers.

17. The system according to claim 15, wherein:
the plurality of distributive transaction monitoring processes comprises one or more of:
  an application monitoring process;
  a service monitoring process;
  a transaction monitoring process; and
  a system monitoring process.

18. The system according to claim 15, wherein the plurality of distributive transaction monitoring processes comprises an application monitoring process which contains a monitoring initiator that initiates a call path tree.

19. The system according to claim 15, wherein:
the plurality of distributive transaction monitoring processes passes monitoring data to one or more plug-ins in a plug-in framework that uses a fan-out plug-in model.

20. The system according to claim 15, further comprising:
a cache that connects to the central monitoring server and the web application, wherein the cache keeps all latest events generated by event sources including user-defined alert checking and system events.

21. The system according to claim 15, wherein:
the web application provides an application pattern that summarizes a calling pattern of a particular request and gives statistic data on each step of each request.

22. The system according to claim 15, wherein:
each of the plurality of local monitor servers uses an internal queue for storing the received performance metrics from the plurality of monitoring thread, and wherein the main thread of said local monitor server can provide the received performance metrics stored in the internal queue to a web console upon request.

23. The system according to claim 15, wherein:
the user can set a dispatch thread number in a configuration file to be a value associated with at least one monitoring thread, in order to select the at least one monitoring thread.

24. The system according to claim 15, wherein:
at least one local monitor server is defined in a configuration file for a distributive transaction monitoring process, and the at least one local monitor server further sends the monitoring control information received from the central monitor server to the distributive transaction monitoring process.

25. The system according to claim 15, wherein:
each monitoring threads is associated with one said transactions associated with the plurality of distributive transaction monitoring processes.

* * * * *

UNITED STATES PATENT AND TRADEMARK OFFICE
CERTIFICATE OF CORRECTION

PATENT NO. : 8,463,894 B2  
APPLICATION NO. : 11/865179  
DATED : June 11, 2013  
INVENTOR(S) : Chen Page 1 of 1

It is certified that error appears in the above-identified patent and that said Letters Patent is hereby corrected as shown below:

In the Specification

In column 4, line 11, delete "point" and insert -- point. --, therefor.

In column 5, line 28, delete "xa_close,xa_start," and insert -- xa_close, xa_start, --, therefor.

In column 5, line 35, after "correlation" insert -- . --.

In column 5, line 49, after "minute" insert -- . --.

In column 7, line 42, delete "anyone" and insert -- any one --, therefor.

In column 7, line 49, after "places" insert -- . --.

In column 10, line 37, after "protocol" insert -- . --.

In column 12, line 28, delete "tpretum( )" and insert -- tpreturn( ) --, therefor.

In column 13, line 5, delete "rcq( )" and insert -- req( ) --, therefor.

In column 13, line 27, delete "tpretum( )" and insert -- tpreturn( ) --, therefor.

In column 14, line 36, delete "mean time," and insert -- meantime, --, therefor.

In the Claims

In column 17, line 2, in Claim 15, delete "thet" and insert -- the --, therefor.

Signed and Sealed this  
Eighth Day of October, 2013

Teresa Stanek Rea  
*Deputy Director of the United States Patent and Trademark Office*